United States Patent
Kass

(10) Patent No.: US 10,570,052 B2
(45) Date of Patent: Feb. 25, 2020

(54) ALUMINUM-FREE BOROSILICATE GLASS

(71) Applicant: Schott AG, Mainz (DE)

(72) Inventor: Christof Kass, Tirschenreuth (DE)

(73) Assignee: Schott AG, Mainz (DE)

( * ) Notice: Subject to any disclaimer, the term of this patent is extended or adjusted under 35 U.S.C. 154(b) by 133 days.

(21) Appl. No.: 15/705,428

(22) Filed: Sep. 15, 2017

(65) Prior Publication Data

US 2018/0079679 A1 Mar. 22, 2018

(30) Foreign Application Priority Data

Sep. 22, 2016 (DE) .......... 10 2016 218 244
Sep. 22, 2016 (DE) .......... 20 2016 005 820 U

(51) Int. Cl.
| | | |
|---|---|---|
| *A61J 1/06* | (2006.01) | |
| *A61J 1/14* | (2006.01) | |
| *C03C 3/089* | (2006.01) | |
| *C03C 4/20* | (2006.01) | |

(52) U.S. Cl.
CPC .......... *C03C 3/089* (2013.01); *A61J 1/06* (2013.01); *A61J 1/1468* (2015.05); *C03C 4/20* (2013.01); *C03C 2204/00* (2013.01)

(58) Field of Classification Search
CPC .......... C03C 4/20; C03C 3/076; C03C 3/078; C03C 3/089; C03C 3/11; C03C 3/115
See application file for complete search history.

(56) References Cited

U.S. PATENT DOCUMENTS

| | | |
|---|---|---|
| 5,242,869 A | 9/1993 | Tarumi et al. |
| 7,144,835 B2 | 12/2006 | Kass et al. |
| 2004/0113237 A1* | 6/2004 | Kass .............. C03C 3/089 257/633 |

FOREIGN PATENT DOCUMENTS

| | | |
|---|---|---|
| DE | 44 30 710 C1 | 5/1996 |
| DE | 103 37 362 A1 | 3/2004 |
| JP | 53-85813 | 7/1978 |
| JP | 2005213132 A | 8/2005 |
| WO | 2016/031345 A1 | 3/2016 |

OTHER PUBLICATIONS

Japanese Office Action including an English translation thereof dated Nov. 20, 2017 for Japanese Patent Application No. 2017-0182347 (9 pages).

\* cited by examiner

*Primary Examiner* — Lee E Sanderson
*Assistant Examiner* — Michael C Romanowski
(74) *Attorney, Agent, or Firm* — Taylor IP, P.C.

(57) ABSTRACT

An aluminum-free borosilicate glass includes the following glass composition (in weight-% on oxide basis): 70-80 $SiO_2$; 8-14 $B_2O_3$; 0 $Al_2O_3$; 0-4 $Na_2O$; 3-10 $K_2O$; 0 $Li_2O$; 3-14 sum $Na_2O+K_2O$; 0-1 CaO; 0-1 MgO; 0-1 BaO; 0-1 SrO; 0-2 sum CaO+MgO+BaO+SrO; 0-1 ZnO; 3.6-14 $ZrO_2$; 0-10 $TiO_2$; and 0.01-2.0 one or more refining agents, the weight ratio of $ZrO_2$:$K_2O$ being in a range of 1.2:1 to 1.4:1.

17 Claims, No Drawings

ALUMINUM-FREE BOROSILICATE GLASS

BACKGROUND OF THE INVENTION

1. Field of the Invention

The invention relates generally to aluminum-free borosilicate glass and the use thereof.

2. Description of the Related Art

Glass is one of the most widely used materials worldwide due to its special properties, in particular due to its excellent mechanical strength, optical properties and durability against chemicals, and can, in addition, be produced relatively cost effectively. Today, glass is found in a wide variety of applications, for example in the building industry, electronics field, transportation, consumer goods for daily use, medical field, laboratory applications, scientific equipment and the like.

One area where glass plays a relatively important role is, for example, the pharmaceutical sector wherein drugs are packaged in glass containers such as vials, ampoules, cartridges or syringes. The special material properties of glass, especially the high transparency, good sterilizability, mechanical resistance, low penetrability and permeability in conjunction with the high chemical resistance ensure its excellent suitability in this area.

Glass compositions that can be used for pharmaceutical purposes must meet high requirements since the glass is generally in direct contact with the medicinal product contained therein. The quality of the content must thereby not be altered by the glass through the direct contact with same in a way that the required threshold values are exceeded. In other words, the glass material must not give off substances in volumes that impair or even toxically alter the effectiveness and stability of the medicinal product contained within.

Frequently used glasses in the pharmaceutical sector are borosilicate glasses (so-called "neutral glasses") with the main components of silicon and boric oxide that generally also contain aluminum, alkali and alkaline earth oxides and tempered or non-tempered soda-lime silicate glasses that contain alkaline and alkaline earth oxides, primarily sodium- and calcium oxide.

Borosilicate glasses in particular have relatively poor chemical resistance to acids and alkaline solutions and low hydrolytic stability due to the relatively high content of $B_2O_3$ in the glass matrix of, for example, 10 to 20 weight-%. Therefore, the glasses usually contain aluminum oxide in order to achieve good hydrolytic resistance and also to improve the crystallization properties. However, such glasses can release aluminum ions which could be undesirable for specific applications. For example, it is currently suspected that aluminum ions can cause health problems in humans with certain predispositions. Therefore, glasses containing aluminum are not really suitable for conventional primary pharmaceutical packaging consisting of glass for storage of liquid drug substances.

In order to modify and improve properties, and to better adapt to desired applications, it is constantly a concern to vary and to improve glass compositions. A problem in this context is, however, that a reduction or an increase in the proportion of one component can induce a multitude of effects that affect the other components, thus also affecting the glass properties. The processes and consequences in the exchange or modification of several components in a glass composition are therefore more complex and are predictable only to a limited extent, or not at all. It is therefore relatively difficult to provide tailor-made glass composition for specific applications. A simple exchange of the aluminum oxide with one or several other components for the purpose of achieving the physical and glass technological properties that are influenced by aluminum oxide is therefore not currently possible. In fact, completely new developments or far-reaching changes in the glass composition are necessary.

Moreover, numerous proposals have become known from the art for borosilicate glasses. Several glass compositions are described below:

DE 44 30 710 C1, for example, describes a borosilicate glass with low boric acid content with high chemical resistance and its uses. The borosilicate glass with high chemical resistance is characterized by a composition in weight-% on oxide basis of:

| | |
|---|---|
| $SiO_2$ | >75 |
| $B_2O_3$ | 1-<9 |
| $Al_2O_3$ | 3-6 |
| $Li_2O$ | 0-4 |
| $Na_2O$ | 0-8 |
| $K_2O$ | 0-6 |
| MgO | 0-3 |
| CaO | 0-3 |
| BaO | 0-2 |
| SrO | 0-2 |
| ZnO | 0-3 |
| $ZrO_2$ | 0-3 |
| $SnO_2$ | 0-3 |
| SnO | 0-3 |
| $TiO_2$ | 0-2 |
| $CeO_2$ | 0-2 |
| $Fe_2O_3$ | 0-1 |
| with | |
| $SiO_2 + B_2O_3$ | >83 |
| $SiO_2 : B_2O_3$ | >8 |
| $SiO_2 + Al_2O_3 + ZrO_2$ | >83 |
| $Li_2O + Na_2O + K_2O$ | 5-10 |
| MgO + CaO + BaO + SrO + ZnO | ≤3. |

The borosilicate glass with low boric acid content is characterized by high resistance having an alkali resistance according to DIN 52322 Class 1, a thermal expansion $\alpha_{20/300}$ between $4.0$–$5.3 \times 10^{-6} K^{-1}$, a ratio $\alpha'/\alpha$ of the thermal expansion coefficient above $T_g(\alpha')$ to below $T_g(\alpha)$ of 4 to 8, a glass transformation temperature between 500° C. and 600° C., high radiation transmittance and a UV-transmission $T_{250\ nm/1\ mm}$ of 0-70% or $T_{300\ nm/1\ mm}$ of 0-91%. The glasses have a high $SiO_2$-content of >75 weight-% and $SiO_2 + B_2O_3 > 83$ weight-% in conjunction with a weight ratio of $SiO_2 : B_2O_3 > 8$ which makes them chemically highly resistant but also leads to high processing temperatures.

DE 103 37 362 A1 and US 2004/0113237 A1 moreover describe aluminum-free borosilicate glasses, wherein the glass has the following composition (in weight-% on oxide basis):

| | |
|---|---|
| $SiO_2$ | 60-78 |
| $B_2O_3$ | 7-20 |
| $Li_2O$ | 0-2 |
| $Na_2O$ | 0-4 |
| $K_2O$ | 3-12 |
| MgO | 0-2 |
| CaO | 0-2 |
| with MgO + CaO | 0-3 |
| BaO | 0-3 |
| ZnO | 0-2 |

-continued

| | |
|---|---|
| $ZrO_2$ | 0.8-12 |
| $TiO_2$ | 0-10 |
| $CeO_2$ | 0-1 |
| $F^-$ | 0-0.6 | and, where applicable, also conventional refining agents in conventional amounts.

U.S. Pat. No. 7,144,835 B2 further describes an aluminum-free borosilicate glass with chemical resistance and having a composition in weight-% on oxide basis:

| | |
|---|---|
| $SiO_2$ | 67-75 |
| $B_2O_3$ | 9-18 |
| $Li_2O$ | 0-1 |
| $Na_2O$ | 0-3 |
| $K_2O$ | 5-10 |
| with $Li_2O + Na_2O + K_2O$ | 5.5-13.5 |
| CaO | 0-1 |
| BaO | 0-1 |
| ZnO | 0-1 |
| $TiO_2$ | 0-1 |
| $ZrO_2$ | 0.8-10.5 |
| $CeO_2$ | 0-0.4 |
| $F^-$ | 0-0.6 | and, where applicable, at least one refining agent in a standard amount.

The exemplary compositions A1 to A11 described in DE 103 37 362 A1, US 2004/0113237 A1 and U.S. Pat. No. 7,144,835 B2 all show relatively moderate crystallization properties. Depending on the employed draw method and the glass products that are to be produced, undesirable crystallization of the glass can occur.

What is needed in the art is a borosilicate glass that is aluminum-free, has improved crystallization properties compared to known glasses and which thus has a low tendency to crystallize. The borosilicate glass should moreover also be suitable for use in the pharmaceutical sector and meet the high demands that are placed on pharmaceutical glasses.

SUMMARY OF THE INVENTION

The prevent invention provides an aluminum-free borosilicate glass, including the following glass composition (in weight-% on oxide basis):

| | |
|---|---|
| $SiO_2$ | 70-80 |
| $B_2O_3$ | 8-14 |
| $Al_2O_3$ | 0 |
| $Na_2O$ | 0-4 |
| $K_2O$ | 3-10 |
| $Li_2O$ | 0 |
| sum $Na_2O + K_2O$ | 3-14 |
| CaO | 0-1 |
| MgO | 0-1 |
| BaO | 0-1 |
| SrO | 0-1 |
| sum CaO + MgO + BaO + SrO | 0-2 |
| ZnO | 0-1 |
| $ZrO_2$ | 3.6-14 |
| $TiO_2$ | 0-10 |
| and one or several refining agents | 0.01-2.0, | the weight ratio of $ZrO_2:K_2O$ being in the range of 1.2:1 to 1.4:1.

One exemplary embodiment formed in accordance with the present invention is an aluminum-free borosilicate glass, comprising the following glass composition (in weight-% on oxide basis):

| | |
|---|---|
| $SiO_2$ | 70-78 |
| $B_2O_3$ | 9-13 |
| $Al_2O_3$ | 0 |
| $Na_2O$ | 0.3-3 |
| $K_2O$ | 4-8 |
| $Li_2O$ | 0 |
| sum $Na_2O + K_2O$ | 4.3-11 |
| CaO | 0-0.5 |
| MgO | 0-0.5 |
| BaO | 0-0.5 |
| SrO | 0-0.5 |
| sum CaO + MgO + BaO + SrO | 0-1 |
| ZnO | 0-0.75 |
| $ZrO_2$ | 4.8-1.2 |
| $TiO_2$ | 0-1 |
| and one or several refining agents | 0.01-2.0, | the weight ratio of $ZrO_2:K_2O$ being in the range of 1.2:1 to 1.4:1.

Accordingly, some exemplary embodiments formed in accordance with the present invention provide an aluminum-free and low-crystallization borosilicate glass having the above glass composition.

As is known, glasses contain aluminum oxide to obtain good hydrolytic stability and to improve the crystallization properties. The borosilicate glass formed according to the present invention may be produced without use of aluminum oxide raw material and have a surprisingly good resistance and excellent crystallization properties.

The term "crystallization poor" borosilicate glass means that a borosilicate glass with low crystallization tendency is provided. The crystallization tendency can, for example, be determined by the rate of the crystallization speed [in μm/min]. The crystallization poor borosilicate glass of the current invention can have a maximum crystallization rate ($KG_{max}$) of ≤0.05 μm/min, such as ≤0.04 μm measured in a crystallization range of 700-1115° C. and a temperature T ($KG_{max}$) of ≤1000° C. This applies to a measurement period of 1 hour.

According to the present invention, the determination of the rate of crystallization occurs according to the gradient method. Granulate samples (0.5-1.0 mm) of the respective glass are tempered in a gradient kiln according to ASTM C 829-81 (reapproved 2010). Subsequently, the respectively longest crystals are microscopically measured. The crystal growth rate in μm/min. results then as quotient from the crystal size and the tempering duration.

In the context of the present invention, the borosilicate glass contains at least 70 weight-%, such as at least 70.5 weight-%, at least 71 weight-%, or at least 71.5 weight-% of $SiO_2$. The maximum amount of $SiO_2$ is 80 weight-%, such as 79.5 weight-%, 79 weight-%, or 78 weight-%. One exemplary range of $SiO_2$ content is 70 to 78 weight-%. The $SiO_2$ content can vary depending on the intended use of the glass and can have an effect on the desired properties, such as high chemical resistance, in particular high acid resistance.

According to the present invention, $B_2O_3$ is present in the glass in an amount in the range of 8 to 14 weight-%, such as 8.5-13.5 weight-%, 8.75-13.25 weight-%, or 9-13 weight-%. $B_2O_3$ serves essentially to lower the thermal expansion, the processing temperature and the melt temperature and, at the same time, to improve the chemical resistance, in particular the hydrolytic resistance. Exceeding the $B_2O_3$ content of 14 weight-% can have the effect that, during the glass melt, greater portions of boric oxide evaporate and disruptively condense in the exhaust region. Dropping below a $B_2O_3$ content of 8 weight-% can have the effect that the processing temperature increases too much and the melting behavior deteriorates.

Except for unavoidable impurities, the glass may be free of $Al_2O_3$. This can allow detachment of aluminum ions from the glass to be completely avoided, along with the associated adverse effects.

The proportions of the individual alkali oxides are defined within specific limits for the glass according to the present invention, due to which, for example, the hydrolytic resistance compared to known glasses from the art is being improved.

Except for unavoidable impurities, the glass may be free of $Li_2O$. Surprisingly, it was found that lithium oxide increases the crystallization speed and, thereby, deteriorates the crystallization properties of the glass. For this reason, some exemplary embodiments of glasses formed according to the present invention are generally lithium-free.

Of the alkali oxides, $Na_2O$ is present in an amount of 0 to 4 weight-%, such as an amount of 0.3 to 3 weight-%. Some exemplary embodiments may contain $Na_2O$ in an amount of 0.5 to 3.0 weight-%, such as an amount of 0.5 to 2.8 weight-%. In some exemplary embodiments, the glass contains at least 0.7 weight-% $Na_2O$.

The $K_2O$ content is 3 to 10 weight-%, such as 3.5 to 9.5 weight-%, 3.75 to 9 weight-%, 4 to 8.5 weight-%, or 4 to 8 weight-%. In some exemplary embodiments, the glass contains at least 4.5 weight-% $K_2O$.

Exceeding the respectively specified alkali oxide content may cause the hydrolytic resistance of the glass to deteriorate. Dropping below the respective alkali oxide content may cause the meltability to deteriorate.

The sum of $Na_2O+K_2O$ in the glass is 3 to 14 weight-%, such as 3.8 to 12.5 weight-%, 4.15 to 12 weight-%, or 4.3 to 11 weight-%.

To achieve good hydrolytic resistance and especially good crystallization properties, the glasses contain the alkali oxides of sodium and potassium in accordance with the ranges specified above.

According to one exemplary embodiment, the weight ratio of $K_2O:Na_2O$ is set additionally to >1.0:1, such as >2.0:1. Consequently, the weight ratio is $K_2O:Na_2O$>1:1, such as 1.5:1, or >2:1. The term ">1" or "more than 1" means, for example, 1.01 or greater; the term ">2" or "more than 2" means, for example, 2.01 or greater. In other words, with a predetermined amount of $Na_2O$, the amount of $K_2O$ (weight-%) is selected so that the amount of $K_2O$ represents more than the amount of $Na_2O$, such as more than double the amount of $Na_2O$ (weight-%).

According to the present invention, $ZrO_2$ is present in the glass in an amount in the range of 3.6 to 14 weight-%, such as 3.8 to 13.3 weight-%, 4.5 to 12.6 weight-%, 4.8 to 11.9 weight-%, or 4.8 to 11.2 weight-%. $ZrO_2$ in the glass composition improves the hydrolytic resistance and alkali resistance of the glass. If the content is too high, however, the processing temperature may increase too much, whereby the chemical resistance is no longer substantially improved.

The glass has a weight ratio of $ZrO_2:K_2O$ in the range of 1.2:1 to 1.4:1. In other words, the respective amounts (weight-%/weight-%) of zirconium dioxide and potassium oxide are adjusted such that the weight ratio $ZrO_2:K_2O=1.2$ to 1.4:1. With a pre-determined amount of $K_2O$ (weight-%), the amount of $ZrO_2$ is selected so that the amount of $ZrO_2$ represents 1.2 to 1.4 times the amount of $K_2O$ (weight-%).

By adhering to this prerequisite, exceptionally good crystallization properties are surprisingly achieved in the glass composition. According to one exemplary embodiment, the ratio of $ZrO_2:K_2O$ (weight-%) is set in the range of 1.22:1 to 1.4:1, such as in the range of 1.23:1 to 1.39:1, in the range of 1:24:1 to 1.38:1, in the range of 1.25:1 to 1:37:1, or in the range of 1.25:1 to 1.35:1. By adhering to the specified range, the extremely good crystallization characteristics of the glass formed according to the present invention can be ensured.

As described above, the defined ratio of both elements improves the crystallization properties in an unexpected manner. The weight ratio between $ZrO_2$ and $K_2O$ provides that especially low crystallization rates are achieved. In combination, the specified levels of potassium and zirconium moreover provide good hydrolytic resistance of the glass.

The alkaline earth oxides of calcium, barium, magnesium, and strontium can be used. They are utilized, respectively, in the range of 0 to 1.0 weight-%, such as 0 to 0.5 weight-%; according to one exemplary embodiment, these alkaline earth oxides are not present. In some exemplary embodiments, no alkaline earth oxides at all are contained in the glass.

The sum of all alkaline earth oxides in the glass therefore amounts to 0 to 2 weight-%, such as 0 to 1 weight-%.

According to one exemplary embodiment, the sum of $CaO+MgO+BaO=0$ (zero) in the glass composition. The glass composition can be completely alkaline earth free with the exception of unavoidable impurities; in other words $CaO+MgO+BaO+SrO=0$ (zero). In some exemplary embodiments, the glass does not contain alkaline earth, because even relatively low alkaline earth contents can cause a decline in the hydrolytic resistance and a deterioration of the crystallization properties. It was noted that the use of alkaline earths provides no advantages for the glass composition. Rather, it was found that, when used, the crystallization rate increased. Therefore, some exemplary embodiments formed according to the present invention have no alkaline earth oxide contained in the glass composition.

The content of ZnO in the glass is 0 to 1 weight-%, such as 0 to 0.75 weight-%, or 0 to 0.5 weight-%. In some exemplary embodiments, the glass contains no ZnO, with the exception of unavoidable impurities. This can prevent undesirable release of Zn into a given contents inside the glass to occur. The glass may contain up to 10 weight-%, such as up to 6 weight-%, or up to 5 weight-% $TiO_2$. Low levels of up to approximately 1 weight-% $TiO_2$ prevent solarization of the glass. $TiO_2$ improves the chemical resistance, especially the alkali resistance. Some exemplary embodiments of a glass formed according to the present invention have a content of between 0 and 1 weight-% of $TiO_2$. In some exemplary embodiments, the glass may be $TiO_2$-free, except for unavoidable impurities.

Thus, in some exemplary embodiments, the borosilicate glass composition formed according to the present invention may contain—with the exception of unavoidable impurities—no aluminum oxide, no alkaline earth oxide, no lithium oxide, no zinc oxide and no titanium oxide.

The glass may contain one or more refining agents. In addition to the already specified $CeO_2$, the refining agents may, for example, be: fluorides such as $Na_2SiF_6$; chloride such as NaCl; and sulfates such as $Na_2SO_4$, which can be present in conventional amounts. This means, depending on the amount and the type of refining agent used, these amounts may be present in the finished glass, for example, in the range of 0.01 to 2 weight-%, such as 0.01 to 1 weight-%. It may be expedient to refine without antimony and arsenic, which may be useful when forming primary pharmaceutical packaging.

In addition to the described glass components, additional components may be contained in the glass which can be present in conventional amounts. However, the specified ranges of the glass components are critical and, when the glass composition is modified too greatly, the achieved special characteristics can be lost.

Methods are known for the manufacture of borosilicate glasses. Known production methods may be used. Since the quality of the glass packaging can be determined also by the production process that is used for the glass packaging, in addition to the selected glass composition and the type of the composition of the contained drug formulation, it is expedient to select a suitable process for the production.

The glass formed according to the present invention can be produced in a tubular shape so that it can be further converted into ampoules, cartridges. syringes, etc. The glass is, however, not limited thereto; other diverse shapes, for example flat glasses, rods or glass blocks, etc. can also be produced.

As is known, glasses which have a crystallization tendency cannot be produced in a draw process because they crystallize too rapidly for such draw processes. The crystallization rate should herein not exceed a limit of 0.1 µm/min in a temperature range that is limited by the liquidus temperature and such a temperature where the viscosity of the glass is $10^{6.5-7.0}$ dPa·s. The liquidus temperature is the temperature above which a material is completely melted. In practice, it is the highest temperature above which crystals are no longer observed.

Exemplary embodiments of glass formed according to the present invention can be produced without problem in a draw process, for example in the Vello-draw process. Empirically, the devitrification limit is—as already mentioned—at a crystallization rate of the devitrification crystals of $KG_{max.}=0.1$ µm/min. At higher values, the glass can only be manufactured to a limited extent with the Vello-draw process. The glasses described herein can have crystallization rates $KG_{max}$ of ≤0.05 µm/min, so that they may be used without problems. The lower the crystallization rate, the higher can be the maximum producible wall thicknesses of the glass tubes and rods. This can be useful for certain fields of application.

The glass can also be produced with the Danner-method; in such an instance, it is also recommended that the devitrification rate should not be greater than approximately 0.05 µm/min.

Suitable raw materials for the glass composition and the process conditions in the production of the glass, for example the atmosphere in the melting furnace, the melting time and the melting temperature, etc. are known and can be selected and provided easily by one skilled in the art.

The borosilicate glasses formed according to the present invention belong entirely to hydrolytic class 1 (according to ISO 720 or USP), to acid resistance class S1 (according to DIN 12 116) and to alkali resistance class A1 (according to ISO 695).

Hydrolytic class HGA 1 according to ISO 720 means, that at 121° C. the amount of $Na_2O$ extracted in water from glass grain having a grain size of 300 to 425 µm after 30 minutes is less than 62 µg $Na_2O$/g glass grain. However, for the determination of the hydrolytic class, the US pharmacopeia (USP) glass grain test was used. The methods are almost identical; only the result is expressed in hydrochloric acid consumption and no conversion occurs to the $Na_2O$ release as in ISO 720.

Acid resistance class S1 according to DIN 12 116 means that, after 6 hours of heating at boiling heat in 6-normal HCl, the surface loss is less than 0.7 mg/100 cm².

Alkali resistance class A1 according to ISO 695 means that there is a weight loss of up to 75 mg/dm², in other words, the glass displays only a slight attack.

Borosilicate glasses therefore have an overall excellent resistance against hydrolytic and alkali attacks.

It has moreover been shown that the glasses formed according to the present invention have excellent chemical resistance in their contact with liquid content substances like active substance solutions, solvents, for example buffering systems or suchlike that are present in a pH range of 1 to 11, in a pH range of 4 to 9, or in a pH range of 5 to 7 and are therefore suitable for storage and keeping these content substances.

Within the scope of the present invention, excellent chemical resistance means that the glasses meet the demands of storage and keeping of liquid content substances to a high degree, in accordance with the pharmaceutical field; in particular, the glass has a hydrolytic resistance according to hydrolytic Class 1 according to ISO 720 or USP, a resistance to acids according to acid resistance class S1 according to DIN 12 116, and a resistance to alkali according to alkali resistance class A1 according to ISO 695.

The glasses formed according to the present invention are therefore excellently suited to the production of pharmaceutical containers that are in contact with content substances and which, therefore, can be provided for accommodation and storage of same.

Content substances that can be used are, for example, all solid and liquid compositions used in the pharmaceutical field.

Without restriction thereto, content substances may, for example, be: liquid medicinal products; a solution comprising one or more active substances and optional additives; buffering systems of all types, for example sodium carbonate buffer such as a 1 molar sodium carbonate solution ($NaHCO_3$) 8.4% with a pH value in the range of 7.0 to 8.5; citrate buffer such as 10 mmol citrate-buffer pH=6 with 150 mmol NaCl and 0.005% tween-20; phosphate buffer such as 10 mmol phosphate buffer pH=7.0 with 150 mmol NaCl and 0.005% tween-20; or water for injection purposes, such as Satorius pure water, rinsed through 0.2 µm filter and with a specific resistance of 18.2 MΩ×cm (consistent with a conductivity of 0.055 µS/cm). Other possible content substances are readily known by those skilled in the art.

The properties of the borosilicate glass are the cause of its excellent suitability for the most diverse applications; for example, for use a primary pharmaceutical packaging such as ampoules or vials, since the substances that are stored in the containers—in particular aqueous solutions—do not appreciably attack the glass; the glass therefore does not release any, or releases only very few, ions, in particular aluminum ions.

Exemplary embodiments formed according to the present invention also include use of the borosilicate glasses formed according to the present invention as primary pharmaceutical packaging, for example as bottles such as large or small bottles, vials such as injection vials, ampoules, cartridges or syringes. "Primary pharmaceutical packaging" is understood herein to be packaging materials consisting of glass which are in direct contact with a medicinal product. The packaging herein protects the medicinal product from environmental influences and assures maintenance of the medicinal substance in accordance with its specifications until use by the patient.

Exemplary embodiments formed according to the present invention also relate to the use of borosilicate glass for the production of tubular glass in the form of semi-finished product, such as for further conversion into primary pharmaceutical packaging.

Other exemplary embodiments formed according to the present invention are primary pharmaceutical packaging that consists of the previously described borosilicate glass. The primary pharmaceutical packaging can be selected from: bottles, such as large or small bottles; vials, for example injection vials; ampoules; cartridges or syringes.

Exemplary embodiments formed according to the present invention also provide the use of the borosilicate glasses in primary pharmaceutical packaging for accommodation and storage of liquid content substances that have a pH-value in a range of 1 to 11, such as in a range of 4 to 9 or in a range of 5 to 7, the liquid content substances can be selected from active substance solutions, buffer solutions or water for injection purposes.

Exemplary embodiments formed according to the present invention also provide a pharmaceutical combination including the primary pharmaceutical packaging that accommodates a liquid content substance which has a pH value in the range of 1 to 11, such as in a range of 4 to 9 or in a range of 5 to 7, the liquid content substance can be selected from an active substance solution, a buffer solution or water for injection purposes.

Exemplary embodiments formed according to the present invention also provide a tubular glass in the form of a semi-finished product, consisting of exemplary embodiments of the borosilicate glass formed according to the present invention.

DETAILED DESCRIPTION OF THE INVENTION

Below, the invention is described in further detail with reference to design examples that illustrate the inventive teaching but does not limit it thereto.

COMPARATIVE EXAMPLES 1 to 11

Known glasses formed according to DE 103 37 362 A1 were tested for their suitability in regard to the crystallization properties. The glasses from described examples A1 to A11 of DE 103 37 362 A1 are specified below:

Glasses A1 to A11 contain $Li_2O$. Moreover, none of these glasses satisfy the condition that the weight ratio $ZrO_2:K_2O$ is to be in the range of 1.2 to 1.4:1. These glasses, in fact, display worse crystallization properties compared to exemplary embodiments of borosilicate glasses formed according to the present invention.

EXAMPLES A12 TO A14 AND COMPARATIVE EXAMPLES V1 TO V4

Exemplary embodiments of glasses A12 to A14 were produced according to the present invention and, for comparison, glasses V1 to V4 and their properties were examined. The compositions and properties of glasses A12 to A14 and V1 to V4 are specified in the following Tables 2 and 3.

TABLE 2

| Glass components | Example A12 Weight-% | Example A13 Weight-% | Example A14 Weight-% |
|---|---|---|---|
| $SiO_2$ | 76.4 | 73.5 | 72.4 |
| $B_2O_3$ | 12.3 | 10.2 | 10.2 |
| $Al_2O_3$ | — | — | — |
| $Li_2O$ | — | — | — |
| $Na_2O$ | 0.7 | 2.8 | 2.8 |
| $K_2O$ | 4.7 | 6.0 | 6.3 |
| MgO | | | |
| CaO | | | |
| BaO | — | | |
| $TiO_2$ | — | | |
| $ZrO_2$ | 5.9 | 7.5 | 8.3 |
| Sum | 100 | 100 | 100 |
| Ratio $ZrO_2:K_2O$ | 1.26 | 1.25 | 1.32 |
| Ratio $K_2O:Na_2O$ | 6.7 | 2.1 | 2.3 |
| Crystallisation rate μm/min | <0.04 | <0.05 | <0.05 |
| USP glass grain usage 0.02M HCl/g glass (mL) | 0.037 | 0.036 | 0.035 |
| Hydrolytic class | 1 | 1 | 1 |

TABLE 3

| Glass Components | Comparative Example V1 | Comparative Example V2 | Comparative Example V3 | Comparative Example V4 |
|---|---|---|---|---|
| $SiO_2$ | 73.7 | 76.4 | 73.7 | 72.7 |
| $B_2O_3$ | 10.2 | 12.3 | 8.2 | 10.1 |
| $Al_2O_3$ | — | — | — | — |
| $Li_2O$ | — | 0.3 | 0.4 | 0.3 |

TABLE 1

| Glass components | A1 | A2 | A3 | A4 | A5 | A6 | A7 | A8 | A9 | A10 | A11 |
|---|---|---|---|---|---|---|---|---|---|---|---|
| $SiO_2$ | 73.0 | 69.5 | 73.5 | 68.6 | 76.5 | 63.6 | 63.1 | 65.0 | 65.5 | 65.5 | 65.0 |
| $B_2O_3$ | 10.8 | 9.5 | 17.0 | 17.5 | 13.7 | 17.5 | 17.5 | 16.5 | 16.5 | 16.5 | 16.5 |
| $Al_2O_3$ | — | — | — | — | — | — | — | — | — | — | — |
| $Li_2O$ | 0.3 | 0.4 | 0.15 | 0.7 | 0.2 | 0.7 | 0.7 | 0.7 | 0.7 | 0.7 | 0.7 |
| $Na_2O$ | 1.7 | 2.0 | 0.1 | 0.9 | 0.3 | 0.9 | 0.9 | 1.6 | 1.0 | 1.6 | 1.0 |
| $K_2O$ | 8.8 | 9.5 | 6.2 | 8.7 | 4.8 | 8.7 | 8.7 | 7.7 | 7.7 | 7.6 | 7.7 |
| MgO | — | — | — | — | — | — | — | — | — | — | — |
| CaO | — | — | 0.9 | — | — | — | — | — | — | — | — |
| BaO | — | — | 0.65 | — | — | — | — | — | — | — | — |
| ZnO | — | — | — | 0.8 | — | 0.8 | 0.8 | 1.5 | 2.0 | 2.0 | 2.0 |
| $TiO_2$ | — | — | 0.5 | — | — | 4.9 | 5.4 | 4.9 | 4.9 | 5.0 | 6.5 |
| $ZrO_2$ | 5.4 | 9.0 | 1.0 | 2.8 | 4.5 | 2.8 | 2.8 | 2.0 | 1.5 | 1.0 | 1.5 |
| Ratio $ZrO_2:K_2O$ | 0.61 | 0.95 | 0.16 | 0.32 | 0.94 | 0.32 | 0.32 | 0.26 | 0.19 | 0.13 | 0.19 |

TABLE 3-continued

| Glass Components | Comparative Example V1 | Comparative Example V2 | Comparative Example V3 | Comparative Example V4 |
|---|---|---|---|---|
| $Na_2O$ | 2.8 | 0.7 | 2.9 | 2.8 |
| $K_2O$ | 6.3 | 4.6 | 6.2 | 6.2 |
| MgO | — | — | 0.3 | — |
| CaO | — | — | 0.3 | — |
| BaO | — | — | — | — |
| $TiO_2$ | — | — | — | — |
| $ZrO_2$ | 7.0 | 5.7 | 8.0 | 7.9 |
| Sum | 100 | 100 | 100 | 100 |
| Ratio $ZrO_2:K_2O$ | 1.11 | 1.24 | 1.29 | 1.27 |
| Ratio $K_2O:Na_2O$ | 2.3 | 6.6 | 2.1 | 2.2 |
| Crystallization rate µm/min | 0.08 | 0.06 | 0.1 | 0.07 |
| USP** Glass grain Usage 0.02M Cl/g Glass (mL) | 0.035 | 0.038 | 0.038 | 0.041 |
| Class | 1 | 1 | 1 | 1 |

**USP . . . US-Pharmacopeia

Comparative example V1: The glass is not consistent with the weight ratio of $ZrO_2:K_2O=1.2$ to 1.4:1.
Comparative example V2: The glass contains $Li_2O$.
Comparative example V3: The glass contains $Li_2O$ alkaline earth oxides.
Comparative example V4: The glass contains $Li_2O$.

The above comparative glasses V1 to V4 show that the previously described ratio of $ZrO_2:K_2O$ of exemplary embodiments of glasses formed according to the present invention represents a critical ratio. When the previously described range is not adhered to, the favorable crystallization properties cannot be achieved. Because such conditions in regard to the glass composition are not met in the comparative examples—for example if $Li_2O$ is present—the properties of the glass composition regularly deteriorate in the comparative examples, meaning that the hydrolytic resistance deteriorates and the crystallization rate increases. In addition, the alkaline earth oxides—even at relatively low levels—show a deterioration of the glass properties.

According to exemplary embodiments formed according to the present invention, therefore, aluminum-free borosilicate glasses are provided, with especially favorable crystallization properties that, at the same time, have high hydrolytic resistance.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An aluminum-free borosilicate glass, comprising the following glass composition (in weight-% on oxide basis):

| | |
|---|---|
| $SiO_2$ | 70-80; |
| $B_2O_3$ | 8-14; |
| $Al_2O_3$ | 0; |
| $Na_2O$ | 0-4; |
| $K_2O$ | 3-10; |
| $Li_2O$ | 0; |
| sum $Na_2O + K_2O$ | 3-14; |
| CaO | 0-1; |
| MgO | 0-1; |
| BaO | 0-1; |
| SrO | 0-1; |
| sum CaO + MgO + BaO + SrO | 0-2; |
| ZnO | 0-1; |
| $ZrO_2$ | 3.6-14; |
| $TiO_2$ | 0-10; |
| and at least one refining agents | 0.01-2.0; | wherein a weight ratio of $ZrO_2:K_2O$ is in a range of 1.2:1 to 1.4:1; and
wherein said borosilicate glass has a maximum crystallization rate ($KG_{max}$) of ≤0.05 µm/min, measured in a crystallization range of 700 1115° C. and a temperature T ($KG_{max}$) of ≤1000° C.

2. The borosilicate glass according to claim 1, comprising the following glass composition (in weight-% on oxide basis):

| | |
|---|---|
| $SiO_2$ | 70-78; |
| $B_2O_3$ | 9-13; |
| $Al_2O_3$ | 0; |
| $Na_2O$ | 0.3-3; |
| $K_2O$ | 4-8; |
| $Li_2O$ | 0; |
| sum $Na_2O + K_2O$ | 4.3-11; |
| CaO | 0-0.5; |
| MgO | 0-0.5; |
| BaO | 0-0.5; |
| SrO | 0-0.5; |
| sum CaO + MgO + BaO + SrO | 0-1; |
| ZnO | 0-0.75; |
| $ZrO_2$ | 4.8-11.2; |
| $TiO_2$ | 0-1; |
| and at least one refining agents | 0.01-2.0; | wherein the weight ratio of $ZrO_2:K2O$ is in the range of 1.2:1 to 1.4:1.

3. The borosilicate glass according to claim 1, wherein the weight ratio of $ZrO_2:K_2O$ is in the range of 1.22:1 to 1.4:1.

4. The borosilicate glass according to claim 1, wherein the sum of $Na_2O+K_2O$ is in a range of 3.8 to 12.5 weight-%.

5. The borosilicate glass according to claim 1, wherein a weight ratio of $K_2O:Na_2O$ is >1.0:1.

6. The borosilicate glass according to claim 1, wherein the glass composition is alkaline earth metal free.

7. The borosilicate glass according to claim 1, wherein the glass composition does not contain aluminum oxide, alkaline earth metal oxide, lithium oxide, zinc oxide and titanium oxide.

8. The borosilicate glass according to claim 1, wherein said borosilicate glass has a hydrolytic resistance according to hydrolytic Class 1 according to ISO 720 or USP, a resistance to acids according to acid resistance class S1 according to DIN 12 116, and a resistance to alkali according to alkali resistance class A1 according to ISO 695.

9. A primary pharmaceutical packaging, comprising: a borosilicate glass, comprising the following glass composition (in weight-% on oxide basis):

| | |
|---|---|
| $SiO_2$ | 70-80; |
| $B_2O_3$ | 8-14; |
| $Al_2O_3$ | 0; |

-continued

| | |
|---|---|
| Na$_2$O | 0-4; |
| K$_2$O | 3-10; |
| Li$_2$O | 0; |
| sum Na$_2$O + K$_2$O | 3-14; |
| CaO | 0-1; |
| MgO | 0-1; |
| BaO | 0-1; |
| SrO | 0-1; |
| sum CaO + MgO + BaO + SrO | 0-2; |
| ZnO | 0-1; |
| ZrO$_2$ | 3.6-14; |
| TiO$_2$ | 0-10; and |
| at least one refining agents | 0.01-2.0; | wherein a weight ratio of ZrO$_2$:K$_2$O is in a range of 1.2:1 to 1.4:1; and wherein said borosilicate glass has a maximum crystallization rate (KG$_{max}$) of ≤0.05 μm/min, measured in a crystallization range of 700 1115° C. and a temperature T (KG$_{max}$) of ≤1000° C.

10. The primary pharmaceutical packaging according to claim 9, wherein said primary pharmaceutical packaging is a container for pharmaceutical products.

11. The primary pharmaceutical packaging according to claim 10, wherein said container is at least one of a bottle, a vial, an injection vial, an ampoule, a cartridge, and a syringe.

12. The primary pharmaceutical packaging according to claim 9, wherein said primary pharmaceutical packaging is configured to accommodate and store a liquid content substance that has a pH-value in a range of 1 to 11.

13. The primary pharmaceutical packaging according to claim 12, wherein the liquid content substance is one of an active substance solution, a buffer solution, and a water for injection purposes.

14. A semi-finished product, comprising: a tubular glass, said tubular glass comprising a borosilicate glass comprising the following glass composition (in weight-% on oxide basis):

| | |
|---|---|
| SiO$_2$ | 70-80; |
| B$_2$O$_3$ | 8-14; |
| Al$_2$O$_3$ | 0; |
| Na$_2$O | 0-4; |
| K$_2$O | 3-10; |
| Li$_2$O | 0; |
| sum Na$_2$O + K$_2$O | 3-14; |
| CaO | 0-1; |
| MgO | 0-1; |
| BaO | 0-1; |
| SrO | 0-1; |
| sum CaO + MgO + BaO + SrO | 0-2; |
| ZnO | 0-1; |
| ZrO$_2$ | 3.6-14; |
| TiO$_2$ | 0-10; and |
| at least one refining agents | 0.01-2.0; | wherein a weight ratio of ZrO$_2$:K$_2$O is in a range of 1.2:1 to 1.4:1; and wherein said borosilicate glass has a maximum crystallization rate (KG$_{max}$) of ≤0.05 μm/min, measured in a crystallization range of 700-1115° C. and a temperature T (KG$_{max}$) of ≤1000° C.

15. A pharmaceutical combination, comprising: a primary pharmaceutical packaging consisting of a borosilicate glass comprising the following glass composition (in weight-% on oxide basis):

| | |
|---|---|
| SiO$_2$ | 70-80; |
| B$_2$O$_3$ | 8-14; |
| Al$_2$O$_3$ | 0; |
| Na$_2$O | 0-4; |
| K$_2$O | 3-10; |
| Li$_2$O | 0; |
| sum Na$_2$O + K$_2$O | 3-14; |
| CaO | 0-1; |
| MgO | 0-1; |
| BaO | 0-1; |
| SrO | 0-1; |
| sum CaO + MgO + BaO + SrO | 0-2; |
| ZnO | 0-1; |
| ZrO$_2$ | 3.6-14; |
| TiO$_2$ | 0-10; and |
| at least one refining agents | 0.01-2.0; | wherein a weight ratio of ZrO$_2$:K$_2$O is in a range of 1.2:1 to 1.4:1; and wherein said borosilicate glass has a maximum crystallization rate (KG$_{max}$) of ≤0.05 μm/min, measured in a crystallization range of 700-1115° C. and a temperature T (KG$_{max}$) of ≤1000° C.

16. The pharmaceutical combination according to claim 15, wherein said primary pharmaceutical packaging is at least one of a bottle, a vial, an injection vial, an ampoule, a cartridge, and a syringe.

17. The pharmaceutical combination according to claim 15, further comprising a liquid content substance which has a pH value in the range of 1 to 11 within said primary pharmaceutical packaging, wherein said liquid content substance is one of an active substance solution, a buffer solution and a water for injection purposes.

\* \* \* \* \*

UNITED STATES PATENT AND TRADEMARK OFFICE
CERTIFICATE OF CORRECTION

PATENT NO. : 10,570,052 B2
APPLICATION NO. : 15/705428
DATED : February 25, 2020
INVENTOR(S) : Kass It is certified that error appears in the above-identified patent and that said Letters Patent is hereby corrected as shown below:

In the Specification

Column 2
At Line 39, in the table, please delete "ZnO".

In the Claims

Column 12
At Line 7, in Claim 1, before "ZnO", please delete "SrO";
At Line 18, in Claim 1, please delete "700 1115° C.", and substitute therefore --700-1115° C."--.

Column 13
At Line 21, in Claim 9, please delete "700 1115° C.", and substitute therefore --700-1115° C."--.

Column 14
At Line 31, in Claim 15, before "ZnO", please delete "SrO".

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*